United States Patent
Lai

(10) Patent No.: US 6,675,834 B1
(45) Date of Patent: Jan. 13, 2004

(54) STRUCTURE FOR SWITCHING FLOW OF FLUID IN A FLUID-CONVEYING SYSTEM

(76) Inventor: Hung-Lin Lai, No. 5-3, Chi Pan Lane, Kou Chien Li, Lu Kang Township, Chang Hua Hsien (TW)

( * ) Notice: Subject to any disclaimer, the term of this patent is extended or adjusted under 35 U.S.C. 154(b) by 157 days.

(21) Appl. No.: 10/071,652
(22) Filed: Feb. 11, 2002
(51) Int. Cl.[7] .............................................. F16K 11/087
(52) U.S. Cl. ................................. 137/625.47; 137/864
(58) Field of Search ....................... 137/625.42, 625.47, 137/864

(56) References Cited

U.S. PATENT DOCUMENTS 1,144,357 A  *  6/1915  Golliher ................. 137/625.46
1,708,273 A  *  4/1929  Larsen .................. 137/625.47
5,944,055 A  *  8/1999  Dicky ................... 137/625.47

* cited by examiner

Primary Examiner—John Fox
(74) Attorney, Agent, or Firm—Harrison & Egbert

(57) ABSTRACT

A structure is designed to switch the flow of fluid in a fluid conveying system. The structure includes two fluid-discharging pipes connected one to end, a valve slot formed at the juncture of the two fluid-discharging pipes, a fluid-admitting pipe fastened to the valve slot, and a ball valve rotatably disposed in the valve slot such that the ball valve can be turned by a valve knob to control the flow of fluid into the two fluid-discharging pipes from the fluid-admitting pipe.

1 Claim, 6 Drawing Sheets

STRUCTURE FOR SWITCHING FLOW OF FLUID IN A FLUID-CONVEYING SYSTEM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a fluid-conveying structure, and more particularly to a structure for switching the flow of fluid.

BACKGROUND OF THE INVENTION

The conventional fluid-conveying structure comprises one fluid admitting pipe, two fluid-discharging pipes, and a switching device used to open, close, or divert the flow of fluid. The switching device of the conventional fluid-conveying structure is limited in function because it is incapable of opening or closing both fluid-discharging pipes at the same time, and because it is also incapable of opening one of the two fluid discharging pipes.

BRIEF SUMMARY OF THE INVENTION

The primary objective of the present invention is to provide a fluid conveying structure with a switching structure which is free of the deficiencies of the conventional structure described above.

In keeping with the principle of the present invention, the foregoing objective of the present invention is achieved by the switching structure comprising a fluid admitting pipe, two fluid discharging pipes, a valve slot located at the juncture of the fluid admitting pipe and the fluid discharging pipes, a ball valve disposed in the valve slot and provided with a T-shaped duct, and a valve knob. The switching structure enables the two discharging pipes to open or close at the same time. In addition, the switching structure is capable of opening only one of the two fluid discharging pipes.

The features and the advantages of the present invention will be more readily understood upon a thoughtful deliberation of the following detailed description of the present invention with reference to the accompanying drawings.

DETAILED DESCRIPTION OF THE INVENTION

Figure 1:
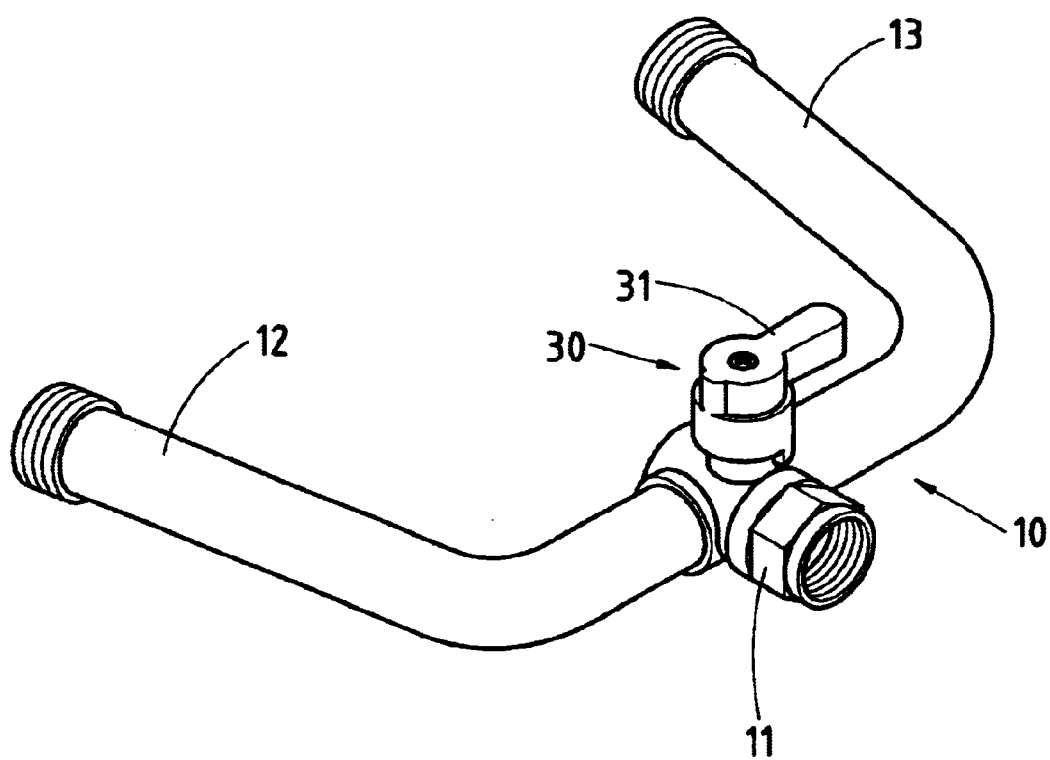
FIG. 1 shows a perspective view of the present invention.
Figure 2:
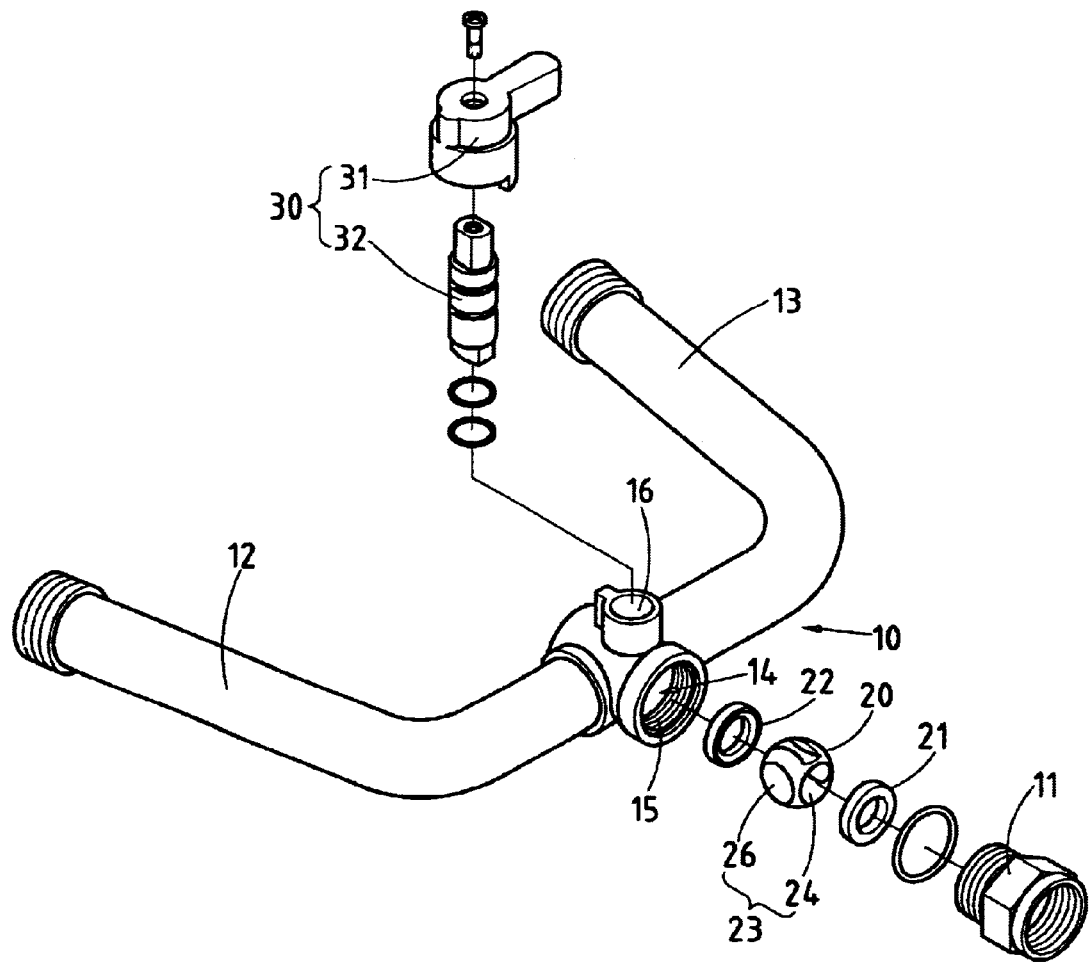
FIG. 2 shows an exploded perspective view of the present invention.

As shown in FIGS. 1–6, a structure 10 embodied in the present invention is used to switch the flow of water in a water-conveying system. The structure 10 of the present invention comprises a water-admitting pipe 11, a first water-discharging pipe 12, a second water-discharging pipe 13, a ball valve 20 located at the juncture of the water-admitting pipe 11 and the two water-discharging pipes 12 and 13, and a valve knob 30.

The first water-discharging pipe 12 and the second water-discharging pipe 13 are provided at the juncture with a valve slot 14, which is provided in an outer side wall thereof with a threaded hole 15 for fastening one end of the water-admitting pipe 11. The valve slot 14 is further provided in the top wall thereof with a receiving hole 16 for mounting the valve knob 30. The valve slot 14 is still further provided in a left side wall with a first outlet 120 in communication with the first water-discharging pipe 12, and in a right side wall with a second outlet 130 in communication with the second water-discharging pipe 13. The first outlet 120 is smaller in hole diameter than the first water-discharging pipe 12. Similarly, the second outlet 130 is smaller in hole diameter than the second water-discharging pipe 13. The first outlet 120 and the second outlet 130 are located in an alternate manner.

The ball valve 20 is disposed in the valve slot 14 in conjunction with two washers 21 and 22, with the second washer 22 being disposed between the first outlet 120 and the second outlet 130. The ball valve 20 is provided with a T-shaped duct 23 which is formed of a one-way channel 24 and a two-way channel 26. In other words, the duct 23 of the ball valve 20 is of a three-way construction. Located between the inner end of the ball valve 20 and the inner side wall of the valve slot 14 is a communication space 27, which enables the duct 23 of the ball valve 20 to be in communication with the second outlet 130 at such time when the duct 23 of the ball valve 20 is joined with the inner side wall of the valve slot 14.

The valve knob 30 is formed of a knob 31 and a stem 32. The stem 32 of the valve knob 30 is mounted in the receiving hole 16 of the top wall of the valve slot 14 such that the stem 32 is fastened at the bottom end with the ball valve 20. The ball valve 20 is turned by the knob 31 which is fastened with the top end of the stem 32.

Figure 3:
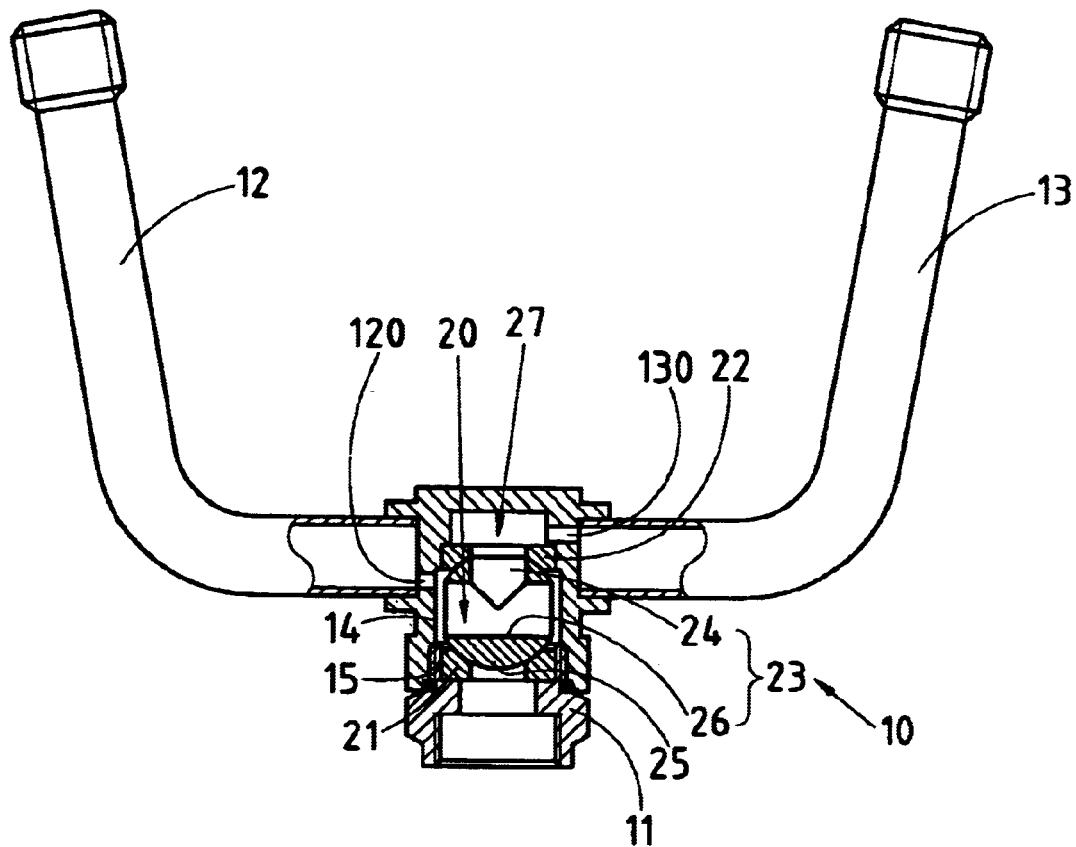
FIG. 3 shows a sectional view of the present invention in a fully-closed state.

As illustrated in FIG. 3, when the ball valve 20 is turned such that the one-way channel 24 of the ball valve 20 is aligned and joined with the communication space 27, a closed side 25 of the ball valve 20 is joined with the first washer 21 to block the water-admitting pipe 11. As a result, water is prevented from flowing into the first water-discharging pipe 12 and the second water-discharging pipe 13 from the water-admitting pipe 11.

Figure 4:
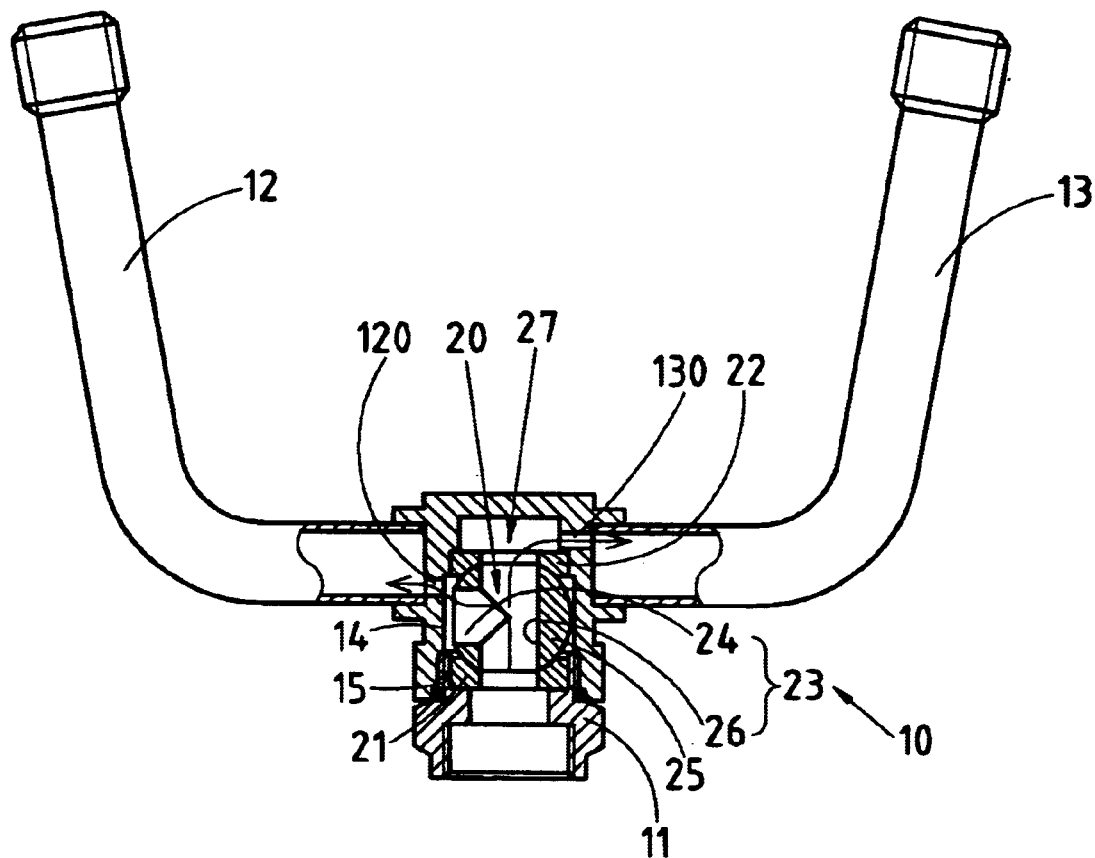
FIG. 4 shows a sectional view of the present invention in a fully-opened state.

Now referring to FIG. 4 in which the one-way channel 24 of the ball valve 20 is shown to join with the first outlet 120, one end of the two-way channel 26 is joined with the water-admitting pipe 11, with other end of the two-way channel 26 being in communication with the second outlet 130 via the communication space 27. As a result, water flows into both the first water-discharging pipe 12 and the second water-discharging pipe 13.

Figure 5:
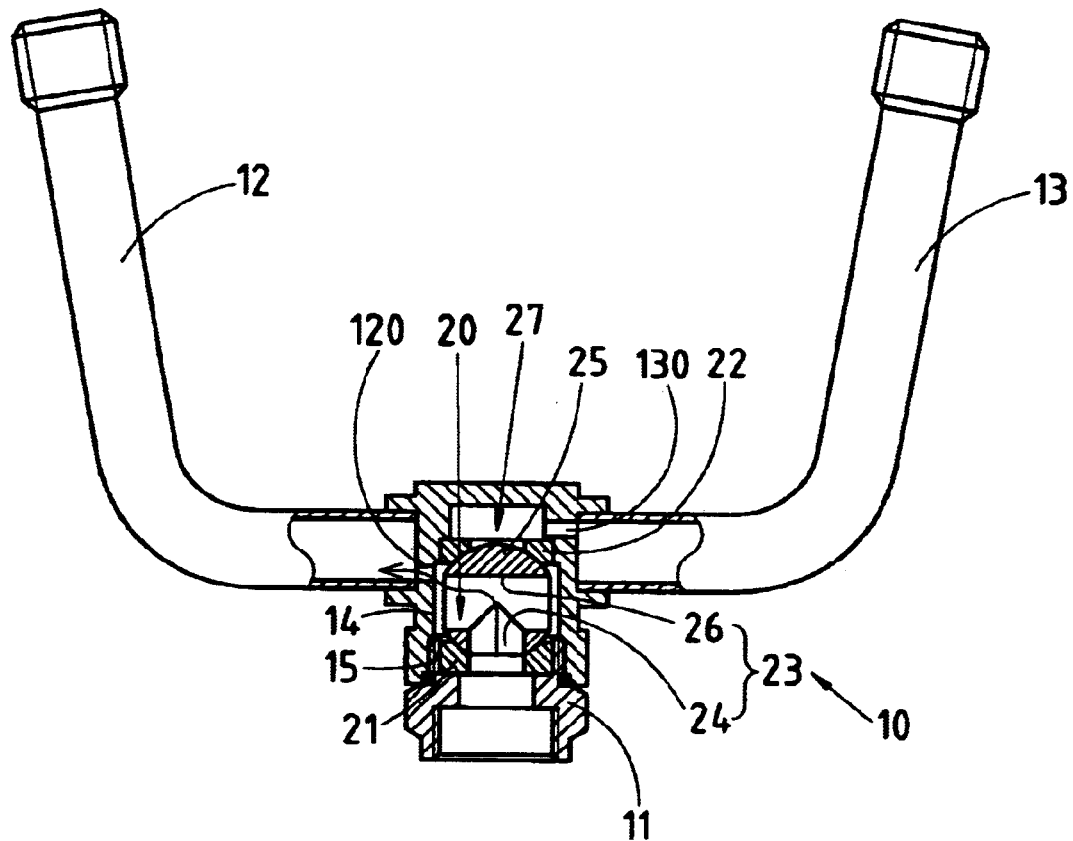
FIG. 5 shows a sectional view of the present invention in a partially-opened state.

As shown in FIG. 5, the ball valve 20 is turned such that the one-way channel 24 is in communication with the water-admitting pipe 11, and that one end of the two-way channel 26 is in communication with the first water-discharging pipe 12 via the first outlet 120, and that other end of the two-way channel 26 is prevented from communicating with the second water-discharging pipe 13 by the second washer 22 and the closed side 25 which is in contact with the second washer 22. In other words, water can not flow into the second water-discharging pipe 13 via the communication space 27 and he second outlet 130. Only the first water-discharging pipe 12 is opened.

Figure 6:
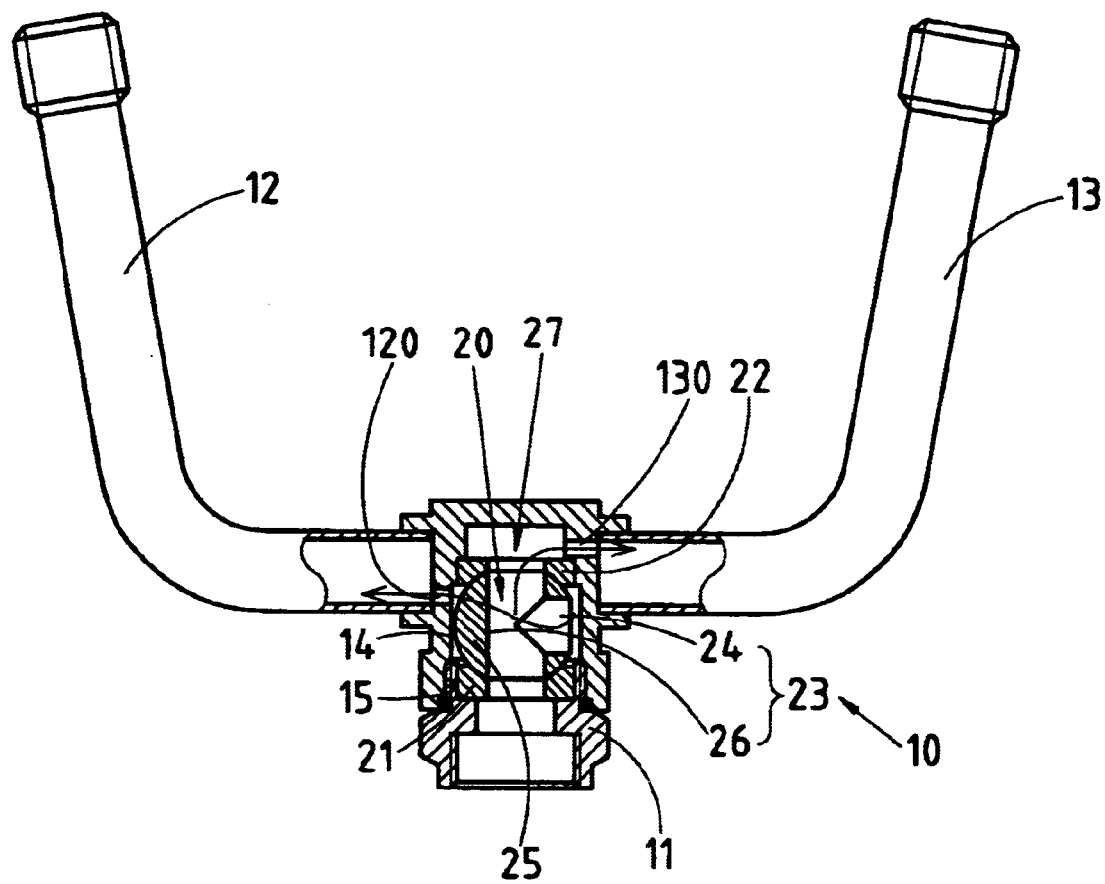
FIG. 6 shows another sectional view of the present invention in the fully-opened state.

As shown in FIG. 6, both the first water-discharging pipe 12 and the second water-discharging pipe 13 are opened. The one-way channel 24 of the ball valve 20 is joined with the right side wall of the valve slot 14, whereas one end of the two-way channel 26 is in communication with the water admitting pipe 11, with other end of the two-way channel 26 being in communication with the second water-discharging pipe 13 via the communication space 27 and the second outlet 130. In light of the right side wall of the valve slot 14 being recessed and in communication with the left side wall of the valve slot 14, the one-way channel 24 is in communication with the first outlet 120 in spite of the left side wall of the valve slot 14 being blocked by the closed side 25 of the ball valve 20. As a result, both the first water-discharging pipe 12 and the second water discharging pipe 13 are opened simultaneously to allow the passage of water.

The present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A structure for switching flow of fluid in a fluid-conveying system comprising:

a first fluid-discharging pipe;

a second fluid-discharging pipe connected end to end with said first fluid-discharging pipe;

a valve slot located at the juncture of said first fluid discharging pipe and said second fluid-discharging pipe such that said valve slot is comprised of and defined by a top wall, a bottom wall, an inner side wall, an outer side wall, a left side wall, and a right side wall whereby said valve slot is comprised of, in said top wall thereof, a receiving hole, in said outer side wall thereof, a fastening hole for fastening a fluid-admitting pipe, in said left side wall thereof, a first outlet in communication with said first fluid-discharging pipe, and in said right side wall thereof, a second outlet in communication with said second fluid-discharging pipe, said first outlet and said second outlet being located alternately;

a ball valve rotatably disposed in said valve slot in conjunction with a first washer and a second washer, with said second washer being located between said first outlet and said second outlet, said ball valve comprising a T-shaped duct which is comprised of a one-way channel and a two-way channel, said ball valve having an inner end whereby said inner end forms a communication space along with said inner side wall of said valve slot; and a valve knob comprised of a knob and a stem which is fastened at a top end to said knob and is received in said receiving hole of said top wall of said valve slot such that said stem is fastened at a bottom end to said ball valve, thereby enabling said ball valve to be turned by said knob such that said one-way channel of said ball valve is joined with said communication space, and such that a closed side of said ball valve is joined with said first washer to block said fluid-admitting pipe so as to prevent fluid from flowing into said first fluid discharging pipe and said second fluid-discharging pipe from said fluid-admitting pipe, said ball valve capable of being turned by said knob in such a manner that said one-way channel of said ball valve is aligned and joined with said first outlet, and such that one end of said two way channel of said ball valve is aligned and joined with said fluid admitting pipe, and such that another end of said two-way channel of said ball valve is in communication with said second outlet via said communication space, thereby enabling fluid to flow into said first fluid-discharging pipe and said second fluid-discharging pipe from said fluid-admitting pipe at the same time, said ball valve still capable of being turned by said knob in such a manner that said one-way channel of said ball valve is in communication with said fluid admitting pipe, and such that one end of said two-way channel is in communication with said first fluid-discharging pipe via said first outlet, and such that another end of said two-way channel of said ball valve is prevented from being in communication with said second fluid discharging pipe by said second washer and said closed side of said ball valve, thereby preventing fluid from flowing into said second fluid-discharging pipe via said communication space and said second outlet from said fluid-admitting pipe.

* * * * *